United States Patent
Debus

(10) Patent No.: US 6,180,210 B1
(45) Date of Patent: Jan. 30, 2001

(54) ABRASION RESISTANT ENERGY ABSORBING TREADMILL WALKING/RUNNING BELT

(75) Inventor: James Walter Debus, Lincoln, NE (US)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 09/194,616

(22) PCT Filed: Sep. 26, 1996

(86) PCT No.: PCT/US96/15393

§ 371 Date: Nov. 30, 1998

§ 102(e) Date: Nov. 30, 1998

(87) PCT Pub. No.: WO98/13109

PCT Pub. Date: Apr. 2, 1998

(51) Int. Cl.[7] .................................. B32B 3/28; F16G 1/28
(52) U.S. Cl. ......................... 428/167; 428/172; 474/250
(58) Field of Search .................................. 428/167, 172; 474/237, 250, 264, 242, 251; 482/54

(56) References Cited

U.S. PATENT DOCUMENTS

| 3,641,601 | 2/1972 | Sieg | 5/345 |
| 3,659,845 | 5/1972 | Quinton | 272/69 |
| 3,689,066 | 9/1972 | Hagen | 272/69 |
| 3,711,090 | 1/1973 | Fiedler | 272/69 |
| 4,509,510 | 4/1985 | Hook | 128/25 |
| 5,018,722 | 5/1991 | Whitmore | 272/69 |

FOREIGN PATENT DOCUMENTS

| 0196877 | 3/1985 | (EP) | A63B/23/06 |
| 1139936 | 12/1955 | (GB) | 5/6 |
| 2441563 | 11/1978 | (GB) | B65G/15/42 |

OTHER PUBLICATIONS

International Search Report.

*Primary Examiner*—Donald Loney
(74) *Attorney, Agent, or Firm*—Roger D Emerson

(57) ABSTRACT

An endless belt (10) for use in exercising treadmills is provided. The endless belt includes at least an underlying ply (18) of low friction material, an internal core (38) of compressive and resilient material, and an overlying skin (42) of abrasion resistant material. The internal core (38) consists of a series of transverse projections (30) having inclined side walls (46, 47). The shape of projections (30) of the internal core (38) allows for the compression thereof while providing a suitable walking/running surface. The underlying ply (18) minimizes friction between the belt and any underlying support. The overlying skin (12) increases the durability of the belt while providing friction between a user's foot and the belt (10) for movement thereof. The belt may further include a reinforcing ply (32) disposed between the underlying ply (18) and the internal core (38).

9 Claims, 3 Drawing Sheets

ABRASION RESISTANT ENERGY ABSORBING TREADMILL WALKING/RUNNING BELT

TECHNICAL FIELD

This invention pertains to the art of endless belts for use in exercising treadmdills, and more specifically to a belt construction for use in an exercising treadmill.

DISCLOSURE OF INVENTION

In the art it is known to use endless conveyor-type belts on exercising treadmills to simulate a walking or running exercise. While conveyor belts useful in industry often employ supporting rollers along their length, such arrangements are unsatisfactory for exercising treadmills because of the bumpy sensation caused thereby. Merely eliminating the supporting rollers, however, causes friction problems between the underside of the belt and the supporting surface.

The conveyor belt system disclosed in U.S. Pat. No. 3,711,090 to Fielder attempts to overcome the friction problem by providing a belt having a low-friction sheet on an inner portion of the belt which moves against a flat support surface which is similarly lined with low-friction material. The support system provides a rigid base without providing for any vertical movement of the belt, or cushion, when in operation.

In order to reduce the likelihood of injury to a user of an exercise treadmill, it is beneficial to provide a yieldable surface which cushions the vertical movements of the user.

U.S. Pat. No. 3,689,066 discloses a fairly complex system whereby a series of collapsible bellows undergird an upper belt section in an effort to provide resilient and yieldable support thereto. The series of bellows are located beneath the inner belt surface and are overlaid with a low-friction sheet. The belt slides against this low-friction sheet during operation of the treadmill.

European Patent Document EP 196 877 discloses a shock absorbent moving platform for use in exercising.

The present invention provides a yieldable and resilient belt for use in an exercising treadmill which further provides a low-friction surface for effective movement of the belt.

According to one aspect of the invention, an endless belt for use with an exercising treadmill comprises a planar first portion comprising a continuous underlying ply of low friction material, and a second portion comprising a series of projections. Each projection has a pair of oppositely inclined side walls and a top, the top being generally parallel to the plane of the first portion. The projections extend the width of the belt and the tops are laterally spaced transverse to the lengthwise dimension of the belt.

According to another aspect of the invention, each of the projections comprise an internal core of compressible and resilient material, and an overlying skin of abrasion resistant material.

According to another aspect of the invention, the low-friction material is selected from the group consisting of: ultra high molecular weight polyethylene (UHMW-PE), nylon, polyester, etc.

According to another aspect of the invention, the compressible and resilient material is selected from the group consisting of: polynorbornene, foam, butyl.

According to another aspect of the invention, the overlying skin is selected from the group consisting of: abrasion resistant synthetic, natural rubber or blends thereof.

According to another aspect of the invention, the first portion further comprises a reinforcing ply disposed between the underlying ply and the second portion.

According to another aspect of the invention, an endless belt for use in an exercising treadmill comprises a continuous underlying ply of low friction material, an internal core of compressible and resilient material, and an overlying skin of abrasion resistant material attached to the internal core. The internal core has an inner surface coextensive with the underlying ply, and an outer surface having a plurality of transversely extending V-shaped grooves therein.

One advantage of the present invention is the provision of an energy absorbing internal core in the construction of a belt for use with an exercising treadmill.

Another advantage of the present invention is the provision of an underlying ply of low friction material in the belt construction to aid movement of the belt against a supporting surface.

Another advantage of the present invention is the cross-sectional shape of the upper portion which allows for expansion of the internal core upon compression of an upper belt section.

Another advantage of the present invention is the provision of V-shaped grooves in the outer surface which helps the belt ease around end rollers.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
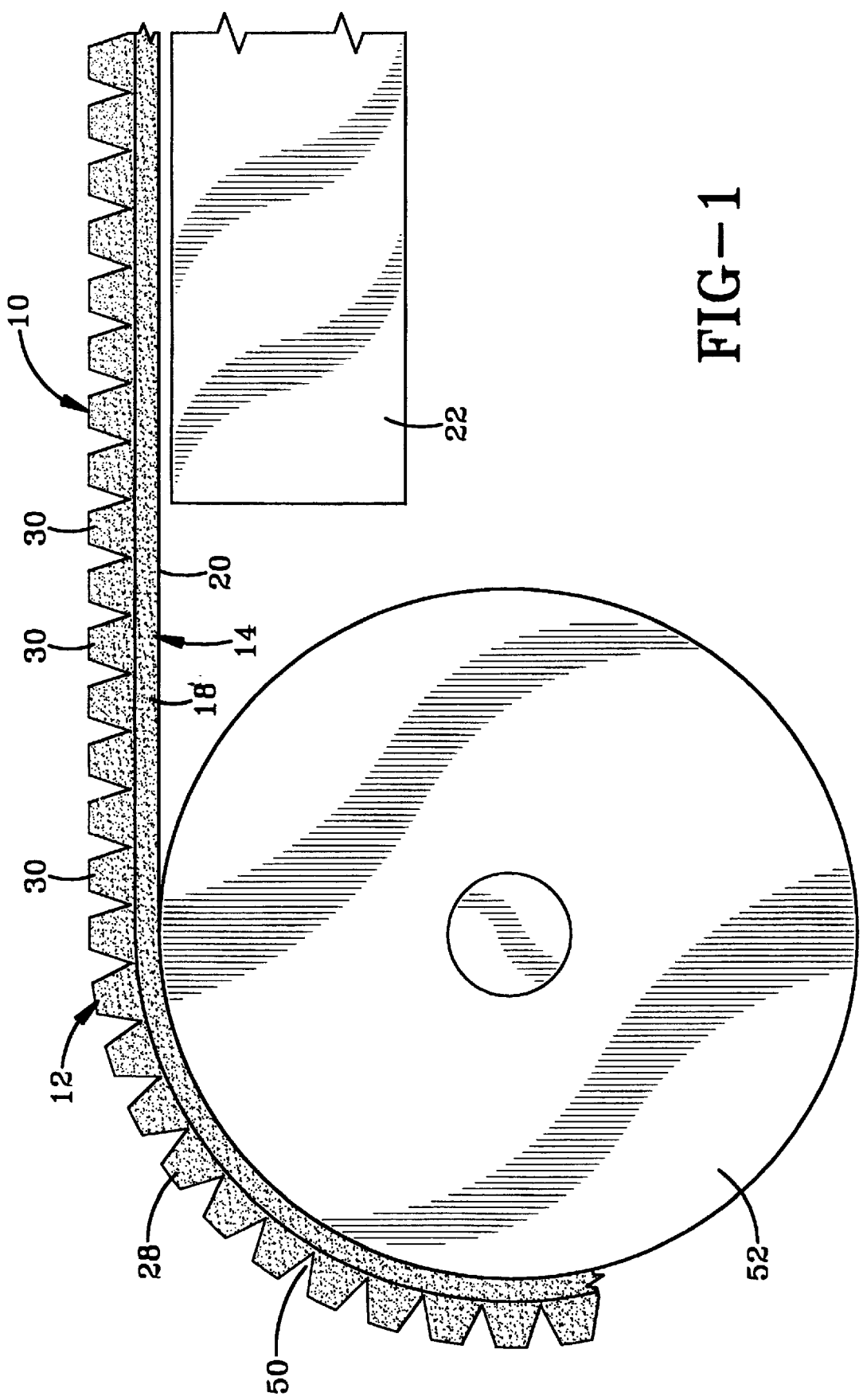
FIG. 1 is a schematic, side view of a part of an endless belt for use in a exercise treadmill according to the present invention.

Referring now to the drawings wherein the showings are for purposes of illustrating a preferred embodiment of the invention only and not for purposes of limiting the same, FIG. 1 shows part of an endless belt 10 of the type used in exercising treadmills, including upper belt section 12. The belt construction of the present invention will be discussed with respect to the upper belt section 12, although is should be understood that the belt construction so disclosed extends throughout the length of the belt 10.

In a preferred embodiment of the invention, the belt 10 comprises two distinct portions. The first portion 14 is innermost and is generally planar along upper belt section 12. The first portion 14 comprises at least a first underlying ply 18 of low-friction material, such as cotton, polyester, and nylon. A preferred embodiment of the present invention utilizes UHMW-PE or polyester as the material of the first underlying ply 18. The first underlying ply 18 has a innermost surface 20 which slidably engages a supporting structure 22 disposed beneath the upper belt section 12.

The second portion 28 of belt 10 is outermost and comprises a series of projections 30 which extend from the planar first portion 14. The projections 30 are transverse to the lengthwise dimension of the belt 10 and extend the entire width of the belt 10 perpendicularly to a longitudinal centerline.

Figure 2:
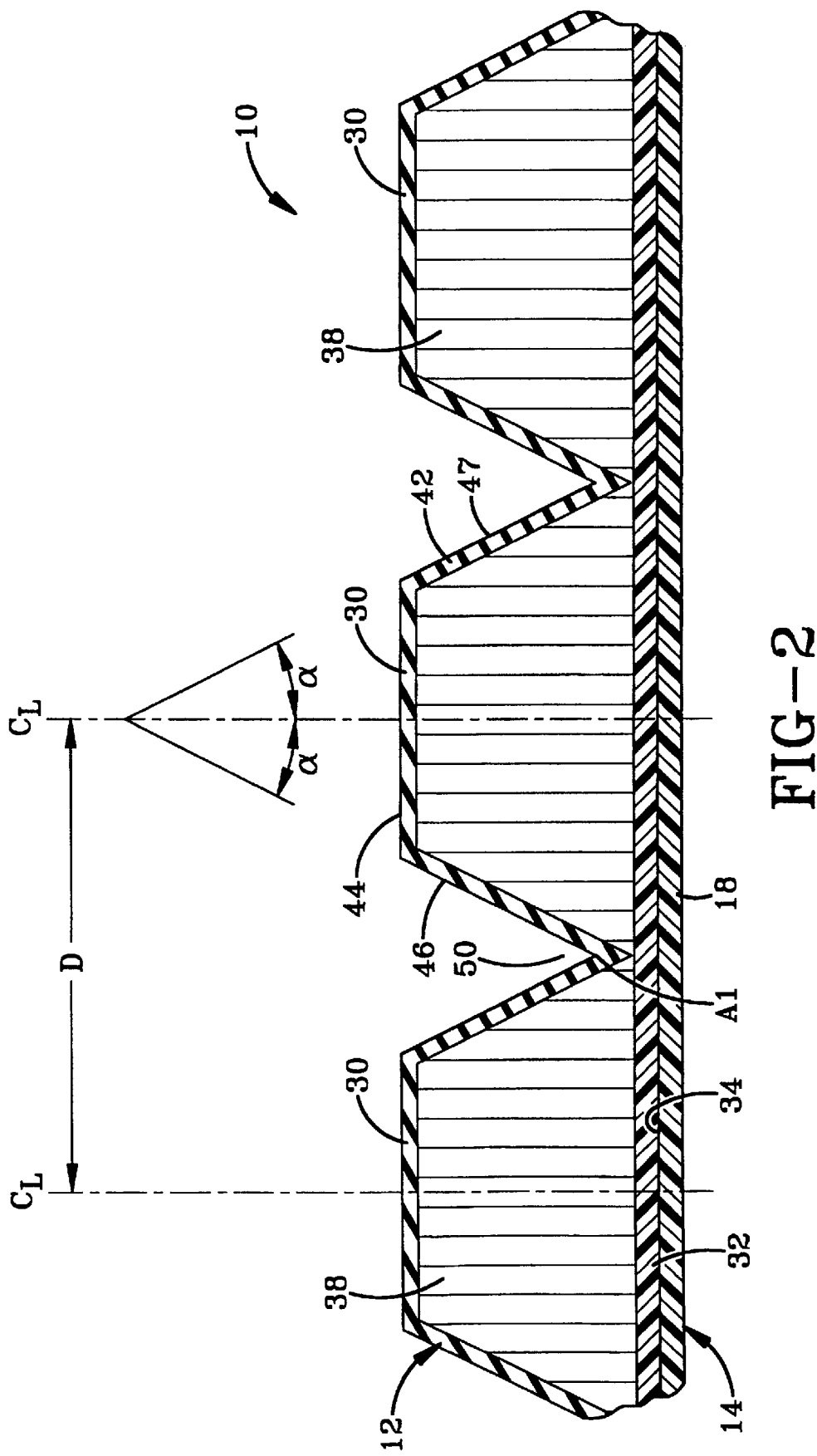
FIG. 2 is a side, cross-sectional view of the endless belt showing a first, uncompressed configuration.

With reference to FIG. 2, first portion 14 may also comprise a reinforcing ply 32 coextensive with the underlying ply 18 and disposed along an outer surface 34 thereof.

With continuing reference to FIG. 2, each of projections 30 comprise an internal core 38 of energy-absorbing material which deflects relatively easily to a compression loading, yet is sufficiently resilient to return to an initial configuration upon removal of compressive force. The internal core material is compressible and resilient when loaded with load approximately equal to a person's weight, i.e., the person for whom the treadmill is intended. Suitable materials for use in the internal core 38 are butyl, foam rubber, soft synthetic rubber. A preferred embodiment of the present invention utilizes polynorbornene as the internal core material.

The projections 30 further comprise an overlying skin 42 of abrasion-resistant, high friction material such as abrasion resistant synthetic, natural rubber, blends. A preferred embodiment utilizes blends as the overlying skin 42.

With continuing reference to FIG. 2, an important aspect of the present invention is the initial, uncompressed configuration of the second portion 28. Each projection is generally trapezoidal in cross section having a top 44, generally parallel to the first portion 14, and having oppositely inclined side walls 46,47. Side walls 46,47 form opposite, equivalent angles +/−α with the centerline of the projection 30. The projections 30 are laterally spaced a distance D from centerline to centerline so that, initially, the inclined side walls 46,47 of adjacent projections 30 define V-shaped grooves 50 therebetween and the area of contact A1 between adjacent projections 30 is minimal. In the preferred embodiment, the projections 30 are 0.125–0.75 (height), α is between 20–60 (degrees) and spaced from 0.25 to 1.0 (distance) apart.

Figure 3:
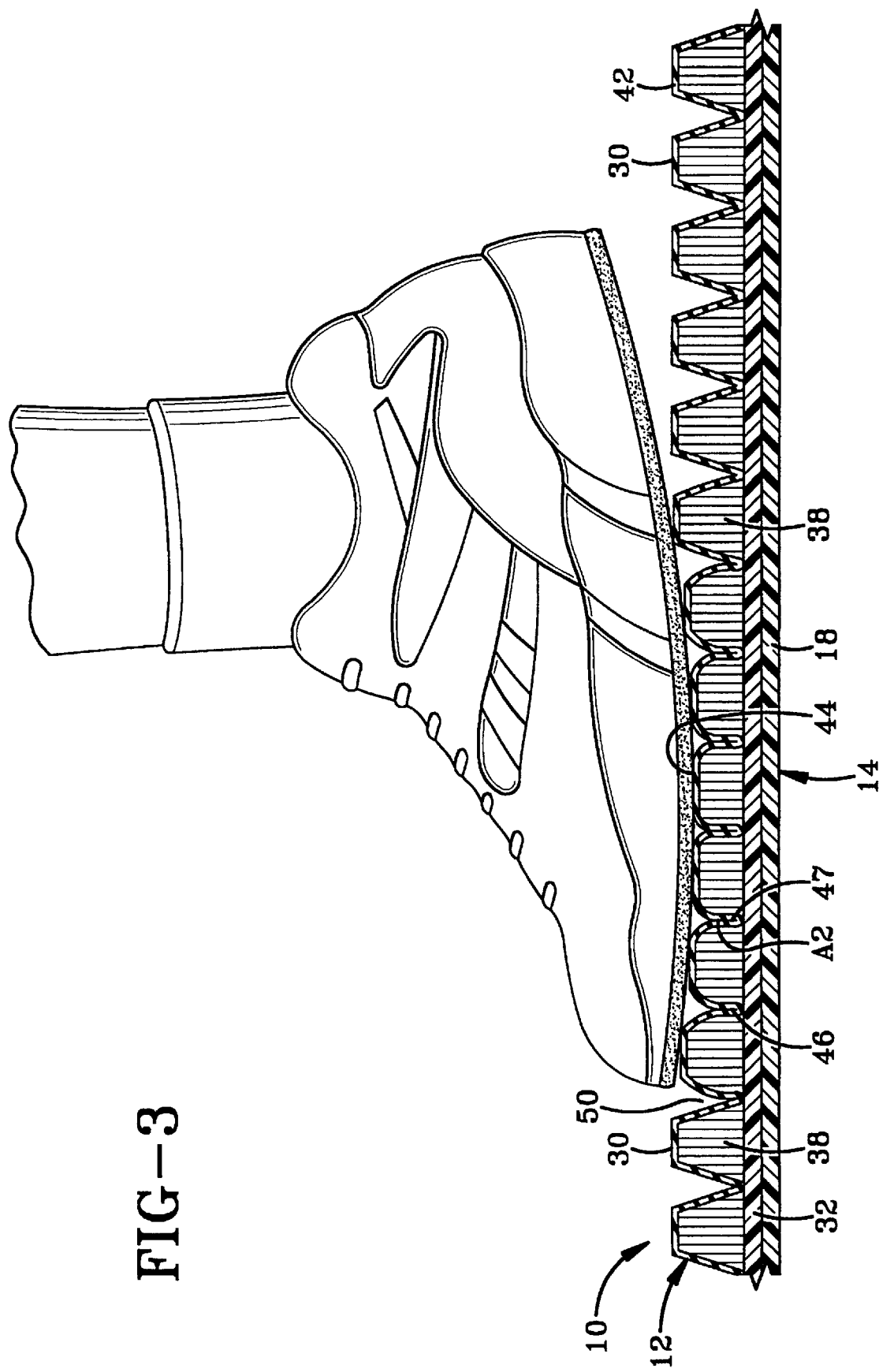
FIG. 3 is a side cross-sectional view of the endless belt showing a second, compressed configuration.

When the upper belt section 12 is compressed, as for example by a user's foot, the projections 30 assume a secondary configuration as shown in FIG. 3. The side walls 46 are outwardly displaced because of the compressible nature of the material used to form the internal core 38. The amount of compression can be varied due to factors such as internal core material, lateral spacing of the projections, stiffness of the overlying skin, and the profiles of the projections.

As is also illustrated in FIG. 3, upon downward compression of the upper belt section 12, the tops 44 of the projections 30 remain essentially parallel to the first portion 14. The side walls 46,47 are displaced into the initial V-shaped grooves 50 between adjacent projections 30 and the area of contact A2 between adjacent projections 30 increases.

With reference again to FIG. 1, it is evident that the V-shaped grooves 50 between adjacent projections 30 help the belt 10 ease around end rollers 52 as are normally present in exercising treadmills.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An endless belt (10) having a width and a lengthwise dimension for use with an exercising treadmill including a planar first portion (14) comprising a continuous underlying ply (18) of low friction material, the endless belt characterized by:

a second portion (28) being disposed outwardly of the first portion, the second portion comprising a series of projections (30) extending the width of the belt, each projection having a pair of oppositely inclined side walls (46, 47) and a top (44), the top being generally parallel to the plane of the first portion, the tops of adjacent projections being laterally spaced transversely to the lengthwise dimension so that adjacent projections have minimal areas of contact therebetween.

2. The endless belt of claim 1 wherein each of the projections comprise:

an internal core (38) of material which is compressible and resilient when loaded with a person's weight; and, an overlying skin (42) of abrasion resistant material.

3. The endless belt of claim 1 wherein the low friction material is selected from the group consisting of: UHMWE-PE, polyester, nylon.

4. The endless belt of claim 2 wherein the compressible and resilient material is selected from the group consisting of: butyl, polynorbornene, and foam rubber.

5. The endless belt of claim 2 wherein the abrasion resistant material is selected from the group consisting of: abrasion resistant synthetic, natural rubber, or blends thereof.

6. The endless belt of claim 1 wherein the first portion further comprises a reinforcing ply (32) disposed between the underlying ply and the second portion.

7. The endless belt of claim 2 wherein the contact areas of adjacent projections is increased upon compression of the second portion.

8. An endless belt use in an exercising treadmill comprising:

a continuous underlying ply of low friction material;

an internal core of compressible and resilient material disposed above the underlying ply, the internal core comprising a series of laterally spaced projections being transverse to the lengthwise dimension and extending the width of the belt; and, an overlying skin of abrasion resistant material, the overlying skin being attached to the internal core.

9. The endless belt of claim 1 wherein the pair of oppositely inclined side walls form opposite, equivalent angles +/−α with a centerline of the projection wherein a is between 20° and 60°.

* * * * *